G. L. RAUDEBAUGH.
SHEARS.
APPLICATION FILED JAN. 27, 1911.
1,007,605.
Patented Oct. 31, 1911.
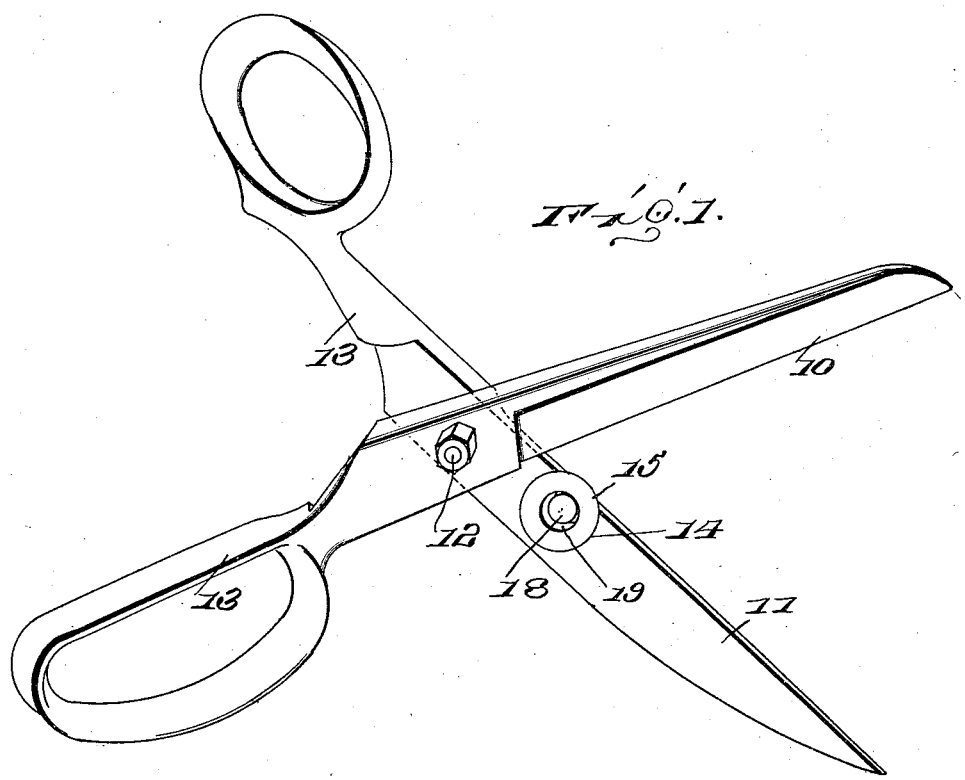
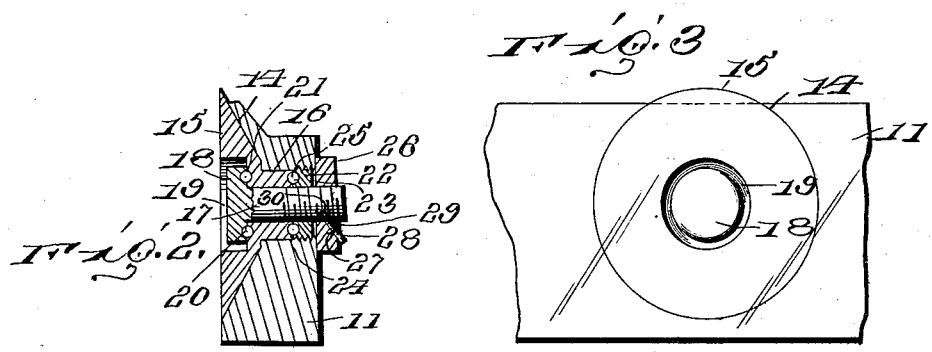
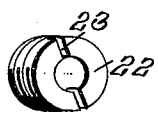
Witnesses
Inventor
G. L. Raudebaugh
By Attorneys
COLUMBIA PLANOGRAPH CO., WASHINGTON, D. C.

UNITED STATES PATENT OFFICE.

GEORGE L. RAUDEBAUGH, OF ROSALIA, WASHINGTON.

SHEARS.

1,007,605.   Specification of Letters Patent.   Patented Oct. 31, 1911.

Application filed January 27, 1911. Serial No. 605,111.

*To all whom it may concern:*

Be it known that I, GEORGE L. RAUDEBAUGH, citizen of the United States, residing at Rosalia, in the county of Whitman and State of Washington, have invented certain new and useful Improvements in Shears, of which the following is a specification.

This invention relates to shears, and has for an object to provide an improved form of shears with a rotary cutter wheel in one edge thereof adapted to coöperate with the opposite cutting edge of the shears.

Another object of this invention is to peculiarly arrange and mount the cutter wheel in the throat of the shears so as to obtain an initial cutting action with the rotary cutter prior to the operation of the beveled cutting edges of the jaws.

The invention still further aims at the provision of a pair of shears having a cutter wheel in the throat thereof which is rotatably mounted in the inner face of one of the jaws or arms of the shears to admit of the sliding uninterrupted contact of the jaws.

The invention designs further to provide a pair of shears with means whereby a slitting action can be effected by holding the blades of the shears at a predetermined angle so as to impinge the object being cut between the roller cutter and the opposite jaw, the roller being set in motion during the slitting action increasing the cutting action and insuring the even cutting of the object.

For a full understanding of the invention and the merits thereof and also to acquire a knowledge of the details of construction, reference is to be had to the following description and accompanying drawings, in which:

Figure 1 is a perspective view of the improved shears disclosing the jaws open; Fig. 2 is a transverse section through one of the jaws of the shears showing the rotary cutter; Fig. 3 is a detail enlarged view of the cutter and the supporting jaw; and, Fig. 4 is a detail perspective view of the adjusting plug.

Corresponding and like parts are referred to in the following description and indicated in all the views of the drawing by the same reference characters.

Referring to the drawing the numerals 10 and 11 designate the crossed jaws of the shears which are hinged upon a transverse bolt 12 midway of their ends. The jaws 10 and 11 are provided, in the usual manner, with handles 13 receiving the hand of the operator to manipulate the shears. The jaws 10 and 11 are formed with beveled cutting edges providing inner opposite faces adapted for close contact with one another when the jaws are in position.

The jaw 11 is formed with a circular depression 14 in its inner face terminating in the cutting edge thereof and adapted to snugly receive a rotary cutting wheel 15. The cutting wheel 15 is of a thickness corresponding to the depth of the depression 14 so as to position the outer face thereof flush with the inner face of the jaw 11. The rotary cutting wheel 15 is centrally apertured and is provided with a concentric sleeve 16 extending inwardly through the jaw 11. A pin 17 passes through the jaw 11 and is provided upon its inner end with an enlarged head 18 seating in a recess 19 formed in the outer face of the cutter 15. The edge of the cutter 15 registers with the edge of the jaw 11 so as to coöperate with the cutting edge of the jaw 10. As will be seen from Fig. 2 the cutter 15 extends a short distance beyond the cutting edge of the jaw 11 so as to meet the jaw 10 prior to its contact with the jaw 11. Registering annular raceways 20 are formed in the opposed faces of the cutter 15 and the enlarged head 18 to accommodate a plurality of ball bearings 21.

The sleeve 16 extends through the jaw 11 but a little over half way of the thickness thereof and abuts against the inner face of a plug 22 which is threaded into the outer side of the jaw 11. The plug 22 carries in its outer face a kerf 23 for the reception of a screwdriver or the like by means of which the plug is adjusted in the jaw. The adjacent ends of the sleeve 16 and the plug 22 are formed with annular raceways 24 receiving therein ball bearings 25 adapted to take up the frictional contact between the sleeve and the plug. A binding nut 26 is employed which is disposed in threaded relation over the outer end of the pin 17 and is adapted to engage against the outer end of the plug 22 and overlap upon the outer side of the jaw 11. The knurled thumb nut 26 is formed in one side with an inwardly inclined and threaded opening 27 through which extends a set screw 28. The inner end of the set screw 28 is adapted to bind against the flattened side 29 of the pin 17, the pin being provided with a radial opening 30 to receive the inner end of the set screw 28. The set screw 28 is employed in holding the knurled nut 26 upon the pin 17 when it is once adjusted. The pin is employed in holding the cutter wheel 15 within the depression 14 and in registration with the cutting edge of the jaw.

The operation of the device is apparent since when the handles 13 are spread apart the jaws 10 and 11 are separated and the rotary cutter 15 is carried with the jaw 11 to coöperate with the cutting edge of the opposite jaw 10. It will be noted that the beveled side of the rotary cutter 15 is against its inner side so as to present a straight or flat outer face to receive slidably thereagainst the inner face of the opposite jaw 10. As the jaws 10 and 11 are closed the object being cut is impinged between the upper edge of the wheel 15 and the cutting edge of the jaw 10, the wheel 15 partially rotating under the action of the resistance of the object being cut. In this manner a rounded cutting edge is produced which can be renewed from time to time by rotating the wheel 15.

Having thus described the invention, what is claimed is:

1. Shears including pivoted jaws, one of the jaws having a depression in its inner face opening through the cutting edge thereof, a rotary cutter wheel seated in the depression and having an inwardly extending sleeve projecting into the jaw, a screw plug fitting in the outer face of the jaw and engaging against the inner end of the sleeve, bearings interposed between the plug and the sleeve, a pin engaging through the cutter wheel, the sleeve and the plug and having an enlarged head upon its inner end seated in the outer face of the cutter wheel and having an annular raceway, bearings disposed in the raceway of the head of the pin and engaging against the rotary cutter to reduce the frictional contact therebetween, and a lock nut carried upon the outer end of the pin and against the outer face of the jaw to hold the pin in position.

2. Shears including pivoted jaws, one of the jaws having a depression in its inner face, opening through the edge of the jaw and communicating with a transverse opening extending through the jaw, a rotary cutter seated in the depression and carrying an inwardly extending sleeve projecting into the opening, a plug fitted adjustably into the outer end of the opening in the jaw, a pin engaging through the sleeve and the plug, bearings interposed between the plug and the sleeve, bearings disposed between the head of the pin and the cutter wheel, and a nut carried upon the outer end of the pin and against the outer face of the jaw for holding the pin adjustably in position.

3. Shears including pivoted jaws, one of the jaws having a depression in its inner face opening through the edge thereof, a rotary cutter wheel seated in the depression and having an inwardly extending sleeve projecting part-way through the jaw, a screw plug fitting in the outer face of the jaw and meeting the inner end of the sleeve, a pin engaging through the cutter wheel the sleeve and the plug and having an enlarged head upon its inner end seated in the outer face of the cutter wheel, and a lock nut carried upon the outer end of the pin against the outer face of the jaw to hold the pin and the plug in position.

4. Shears including pivoted jaws, one of the jaws having a depression in its inner face opening through the cutting edge of the jaw and having a transverse opening extending through the jaw, a rotary cutter seated in the depression and having an inwardly extending sleeve projecting into the opening, a pin engaging through the sleeve, a plug carried about the end of the pin and within the outer face of the jaw for engagement against the end of the sleeve, a nut carried upon the outer extremity of the pin against the outer face of the jaw, and a set screw extending through the nut and engaging with the pin to lock the nut in position.

5. Shears including pivoted jaws, one of the jaws being provided with a depression in its inner face and a transverse opening registering with the depression a cutter wheel mounted in the depression and having a sleeve extending into the opening, a headed pin engaging through the cutter wheel and the sleeve, an adjustable plug threaded in the outer end of the opening and abutting against the end of the sleeve, and a binding nut adjustably disposed upon the outer end of the pin against the outer face of the jaw.

In testimony whereof, I affix my signature in presence of two witnesses.

GEORGE L. RAUDEBAUGH. [L. S.]

Witnesses:
 R. W. HUTCHINSON,
 T. S. HUTCHINSON.

---

Copies of this patent may be obtained for five cents each, by addressing the "Commissioner of Patents, Washington, D. C."